(12) United States Patent
Sim et al.

(10) Patent No.: US 12,189,733 B2
(45) Date of Patent: Jan. 7, 2025

(54) BIOMETRIC AUTHENTICATION APPARATUS AND OPERATION METHOD THEREOF

(71) Applicant: ELECTRONICS AND TELECOMMUNICATIONS RESEARCH INSTITUTE, Daejeon (KR)

(72) Inventors: Joo Yong Sim, Daejeon (KR); Hyung Wook Noh, Daejeon (KR); Chang-Geun Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 741 days.

(21) Appl. No.: 17/239,005

(22) Filed: Apr. 23, 2021

(65) Prior Publication Data

US 2021/0334348 A1 Oct. 28, 2021

(30) Foreign Application Priority Data

Apr. 24, 2020 (KR) .................. 10-2020-0050048
Apr. 12, 2021 (KR) .................. 10-2021-0047311

(51) Int. Cl.
*G06F 21/00* (2013.01)
*G06F 21/32* (2013.01)
(Continued)

(52) U.S. Cl.
CPC .............. *G06F 21/32* (2013.01); *G06V 40/50* (2022.01); *G06V 40/70* (2022.01);
(Continued)

(58) Field of Classification Search
CPC .............. G06F 21/32; G06F 2218/10; G06F 2221/2139; G06F 18/24133;
(Continued)

(56) References Cited

U.S. PATENT DOCUMENTS 10,255,738 B1\* 4/2019 Fernandez ......... G07C 9/00563
10,913,426 B2 2/2021 Zhao
(Continued)

FOREIGN PATENT DOCUMENTS

KR 101607432 B1 3/2016
KR 20170059880 A 5/2017
(Continued)

OTHER PUBLICATIONS

J. Y. Sim et al., "Identity Recognition Based on Bioacoustics of Human Body," IEEE Transactions on Cybernetics, 2019, pp. 1-12.

*Primary Examiner* — William A Corum, Jr.

(57) ABSTRACT

A biometric authentication apparatus is provided. The biometric authentication apparatus includes one or more converters that convert a transmit signal of an electrical signal into a vibration signal of a mechanical signal and transmit the vibration signal vibrating within a set frequency range to a user, one or more sensor that receive a biometric signal corresponding to the vibration signal from the user and convert the biometric signal into a receive signal of an electrical signal, an authentication module that extracts anatomical feature information of the user from the receive signal and determines whether the user is a registered user based on the anatomical feature information, and a memory that stores a database for the registered user. The biometric signal is a frequency-based signal modified to include the anatomical feature information while the vibration signal passes through at least a portion of the body of the user.

16 Claims, 8 Drawing Sheets

(51) Int. Cl.
  *G06V 40/50* (2022.01)
  *G06V 40/70* (2022.01)
  *G06V 40/10* (2022.01)
(52) U.S. Cl.
  CPC .. *G06F 2218/10* (2023.01); *G06F 2221/2139* (2013.01); *G06V 40/15* (2022.01)
(58) Field of Classification Search
  CPC .. G06F 18/24323; G06V 40/50; G06V 40/70; G06V 40/15
  See application file for complete search history.

(56) References Cited

U.S. PATENT DOCUMENTS

| | | | |
|---|---|---|---|
| 2003/0133596 A1 | 7/2003 | Brooks | |
| 2017/0147864 A1 | 5/2017 | Ahn | |
| 2019/0384898 A1* | 12/2019 | Chen | G06F 21/36 |
| 2019/0384901 A1 | 12/2019 | Osborn et al. | |
| 2020/0019690 A1 | 1/2020 | Sim et al. | |
| 2020/0184059 A1* | 6/2020 | Wu | G06V 40/172 |
| 2021/0073511 A1* | 3/2021 | Buchan | G01N 29/2437 |
| 2021/0182372 A1* | 6/2021 | Park | G06F 3/016 |
| 2022/0350867 A1* | 11/2022 | Cronin | G06F 3/04886 |

FOREIGN PATENT DOCUMENTS

| | | |
|---|---|---|
| KR | 20180061826 A | 6/2018 |
| KR | 10-2019-0104174 A | 9/2019 |
| KR | 20200007656 A | 1/2020 |

* cited by examiner

BIOMETRIC AUTHENTICATION APPARATUS AND OPERATION METHOD THEREOF

CROSS-REFERENCE TO RELATED APPLICATIONS

This application claims priority under 35 U.S.C. § 119 to Korean Patent Applications No. 10-2020-0050048 filed on Apr. 24, 2020 and No. 10-2021-0047311 filed on Apr. 12, 2021 in the Korean Intellectual Property Office, the disclosures of which are incorporated by reference herein in their entireties.

BACKGROUND

Embodiments of the present disclosure described herein relate to a biometric authentication technology, and more particularly, relate to a biometric authentication apparatus using a frequency response characteristic of a biometric signal and an operation method thereof.

A security technology using biometric authentication is a means of verifying personal identification, which extracts, stores, and determines a physical feature (e.g., a fingerprint, a face, an iris, or the like) of a person by means of an automated information technology. In the Fourth Industrial Revolution and the hyper-connected era, the importance and necessity of a security technology of biometric authentication are getting higher and higher.

However, an image-based biometric authentication technology being commercialized is vulnerable to copying and theft. Furthermore, unlike a password scheme, because it is impossible to change patterns, there is a high risk due to theft. For example, it is difficult to change image data such as a face and a fingerprint after being registered to verify identity. Thus, recently, to avoid difficulty of the image-based biometric authentication technology, a biometric authentication technology using a frequency response characteristic has been developed.

SUMMARY

Embodiments of the present disclosure provide a biometric authentication apparatus for detecting a change in a vibration signal passing through a body of a user and recognizing the user and an operation method thereof.

According to an embodiment, a biometric authentication apparatus may include one or more converters configured to convert a transmit signal of an electrical signal into a vibration signal of a mechanical signal and transmit the vibration signal vibrating within a set frequency range to a user; one or more sensors configured to receive a biometric signal corresponding to the vibration signal from the user and convert the biometric signal into a receive signal of an electrical signal, an authentication module configured to extract anatomical feature information of the user from the receive signal and determine whether the user is a registered user based on the anatomical feature information, and a memory configured to store a database for the registered user. The biometric signal may be a frequency-based signal modified to include the anatomical feature information while the vibration signal passes through at least a portion of a body of the user.

In an embodiment, the anatomical feature information may include at least one of a biomaterials feature, a biomechanical feature, and a geometrical structure feature for at least one of a bone, a cartilage, a tendon, and a muscle tissue, which are included in the at least a portion of the body of the user.

In an embodiment, the authentication module may include a waveform generator configured to generate a reference waveform within the set frequency range and control the one or more converters to output the vibration signal depending on the reference waveform, a demodulator configured to receive the receive signal from the sensor and demodulate the receive signal based on the reference waveform, a filter configured to filter the demodulated receive signal, and a micro-controller configured to process the filtered receive signal to extract the anatomical feature information, classify the user based on the anatomical feature information, and compare the classified user with the registered user to determine whether the classified user corresponds to the registered user.

In an embodiment, the micro-controller may receive a user contact signal and may control the waveform generator to generate the reference waveform in response to the user contact signal.

In an embodiment, registration user information including the anatomical feature information of the registered user may be stored in the database. The micro-controller may receive the registration user information from the memory and may retrieve for the registration user information corresponding to information of the classified user.

In an embodiment, the micro-controller may output a success message for user authentication, when the registration user information corresponding to information of the classified user is retrieved, and may output a failure message for the user authentication, when the registration user information corresponding to information of the classified user is not retrieved.

In an embodiment, the one or more sensors may include a first sensor and a second sensor being located at different locations. Each of the first sensor and the second sensor may be spaced apart from the one or more converters at a certain distance. The first sensor and the second sensor may respectively receive a first biometric signal and a second biometric signal passing through different portions of the body of the user.

In an embodiment, the one or more converters may include a first converter. The first converter may output a first vibration signal of a first set frequency range and a second vibration signal of a second set frequency range. The first sensor may receive the first biometric signal corresponding to the first vibration signal, and the second sensor may receive the second biometric signal corresponding to the second vibration signal.

In an embodiment, the one or more converters may include a second converter and a third converter being located at different locations. The second converter may output a third vibration signal of a third set frequency range, and the third converter may output a fourth vibration signal of a fourth set frequency range.

In an embodiment, the one or more sensor may include a third sensor. The one or more converters may include a fourth converter and a fifth converter being located at different locations. The fourth converter may output a fourth vibration signal of a fourth set frequency range. The fifth converter may output a fifth vibration signal of a fifth set frequency range. The third sensor may receive a fourth biometric signal corresponding to the fourth vibration signal and a fifth biometric signal corresponding to the fifth vibration signal.

In an embodiment, the biometric authentication apparatus may further include a vibration insulator disposed between the one or more converters and the one or more sensors.

In an embodiment, the biometric authentication apparatus may further include a guide being in contact with the at least a portion of the body of the user to fix the at least a portion of the body of the user.

In an embodiment, the one or more converters and the one or more sensors may be arranged in a direction opposite to a surface being in contact with the at least a portion of the body on the guide. One or more locations of the one or more converters and one or more locations of the one or more sensors may be displayed on the guide.

According to an embodiment, an operation method of a biometric authentication apparatus may include outputting a vibration signal vibrating within a set frequency range depending on a reference waveform to a user, receiving a biometric signal corresponding to the vibration signal from the user, extracting anatomical feature information of the user from the biometric signal, classifying the user based on the anatomical feature information, determining whether the user is a registered user, and completing user authentication in response to determining that the user is the registered user. The biometric signal may be measured by a sensor and may be a frequency-based signal modified to include the anatomical feature information while the vibration signal passes through at least a portion of a body of the user.

In an embodiment, the anatomical feature information may include at least one of a biomaterials feature, a biomechanical feature, and a geometrical structure feature for at least one of a bone, a cartilage, a tendon, and a muscle tissue, which are included in the at least a portion of the body.

In an embodiment, the receiving of the biometric signal may include converting the biometric signal into a receive signal of an electrical signal.

In an embodiment, the extracting of the anatomical feature information of the user may include modulating the receive signal based on the reference waveform, filtering the modulated receive signal, converting the filtered receive signal into a digital signal, and processing the digital signal to extract the anatomical feature information.

In an embodiment, the classifying of the user may include classifying the user based on the anatomical feature information using a classification algorithm.

In an embodiment, the operation method may further include, in response to determining that the user is not the registered user, outputting a feedback signal requesting the user to perform re-authentication and repeating a user authentication operation a predetermined number of times.

According to an embodiment, a biometric authentication apparatus may include a vibration signal transceiver configured to transmit a vibration signal to a user and receiving a biometric signal corresponding to the vibration signal, an authentication module configured to extract anatomical feature information of the user based on the biometric signal and determine whether the user is a registered user based on the anatomical feature information, and a memory configured to store a database for the registered user. The vibration signal transceiver may include a conversion circuit configured to convert a transmit signal of an electrical signal into the vibration signal of a mechanical signal and transmit the vibration signal vibrating within a set frequency range to the user, and a sensing circuit configured to receive the biometric signal corresponding to the vibration signal from the user and convert the biometric signal into a receive signal of an electrical signal, The biometric signal may be a frequency-based signal modified to include the anatomical feature information while the vibration signal passes through at least a portion of a body of the user.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
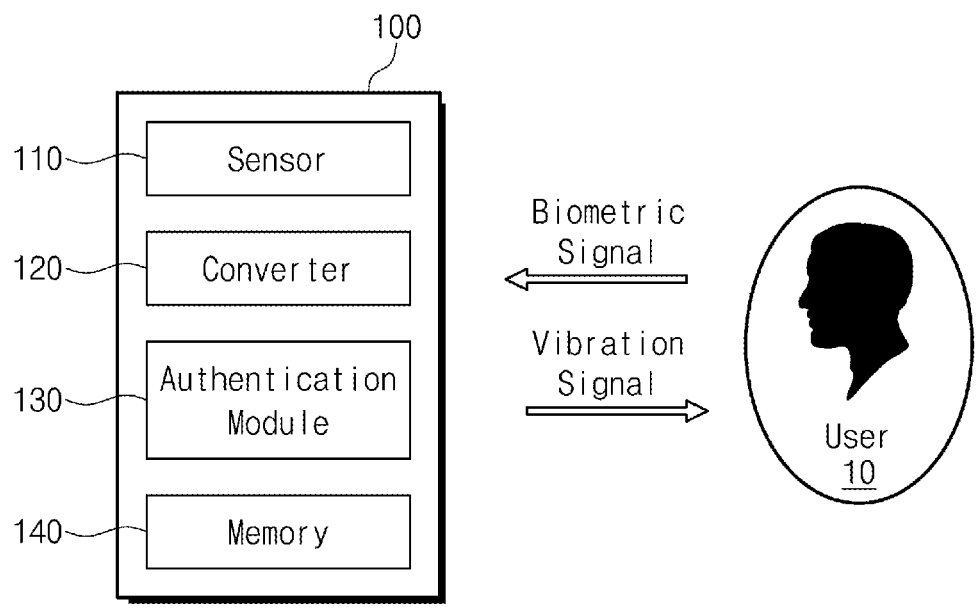
FIG. 1 is a block diagram of a biometric authentication apparatus according to an embodiment of the present disclosure.

Hereinafter, embodiments of the present disclosure will be described clearly and in detail to such an extent that those skilled in the art easily carry out the present disclosure.

Hereinafter, an embodiment of the present disclosure will be described in detail with reference to the accompanying drawings. The same reference numerals are used for the same components throughout the drawings and redundant descriptions of the same components are omitted, in order to facilitate the overall understanding in describing the present disclosure.

FIG. 1 is a block diagram of a biometric authentication apparatus according to an embodiment of the present disclosure. Referring to FIG. 1, a biometric authentication apparatus 100 may include a sensor 110, a converter 120, an authentication module 130, and a memory 140.

The biometric authentication apparatus 100 may transmit a vibration signal to a user 10, may obtain a biometric signal from the user 10, and may perform user authentication based on the biometric signal. Herein, the biometric authentication apparatus 100 may transmit a frequency spectrum based vibration signal to the user 10 and operate based on frequency response characteristics of the vibration signal and the biometric signal. According to an embodiment, the biometric authentication apparatus 100 may transmit an acoustic vibration signal to the user 10 and may obtain a biometric signal including an acoustic vibration characteristic of the human body from the user 10. The biometric authentication apparatus 100 may extract an anatomical characteristic of a bone, a muscle tissue, or the like of the human body using the acoustic vibration characteristic, may classify the user 10, and may perform the resulting user authentication. Hereinafter, the vibration signal in the specification may include an acoustic vibration signal.

The sensor 110 may receive a biometric signal from the user 10. The biometric signal may be a signal in which the vibration signal passes through at least a portion of a body of the user 10. The biometric signal may include anatomical feature information of the user 10. The sensor 110 may receive a biometric signal which is a vibration signal and may convert the biometric signal into an electrical signal to provide the authentication module 130 with the converted electrical signal. For example, the sensor 110 may include a vibration sensor or a microphone.

The sensor 110 may be one or more in number. For example, the sensor 110 may include a first sensor and a second sensor, which are mounted on different locations. The first sensor and the second sensor may receive a first biometric signal and a second biometric signal, each of which has a different frequency range. The first biometric signal and the second biometric signal may be signals passing through different portions of the body of the user, which may include different anatomical characteristic information. According to an embodiment, the first sensor and the second sensor may switch by the authentication module 130 to operate.

According to an embodiment, the sensor 110 may further include a touch sensor or a proximity sensor. In this case, the touch sensor or the proximity sensor may be mounted on the same location or a different location from the vibration sensor. The touch sensor may sense contact of the user 10 and may provide the authentication module 130 with a user contact signal upon the contact of the user 10. The proximity sensor may sense a distance between the biometric authentication apparatus 100 and the user 10. When the sensed distance is less than a certain distance, the proximity sensor may provide the authentication module 130 with a user approaching signal.

The converter 120 may output a vibration signal to the user 10. The vibration signal may be a frequency spectrum based signal, a frequency of which varies within a set frequency range. The converter 120 may receive a frequency spectrum based reference waveform from the authentication module 130 and may convert the reference waveform into a vibration signal which is a mechanical signal to transmit the converted vibration signal to the user 10. The vibration signal may be modified to a biometric signal by an anatomical structure feature while passing through a portion of the body of the user 10.

The converter 120 may be disposed spaced apart from the sensor 110. For example, when the biometric authentication apparatus 100 performs user authentication based on anatomical feature information about a finger of the user 10, the converter 120 may be disposed spaced apart from the sensor 110 by a length of the finger. In detail, the sensor 110 may be located on a first point of the biometric authentication apparatus 100, which corresponds to a portion where the finger ends, and the converter 120 may be located on a second point, which corresponds to a portion where the finger starts.

According to an embodiment, the converter 120 may be one or more in number. For example, when the converter 120 is one and when the sensor 110 is plural in number, a first vibration signal of a first frequency range output from the converter 120 may be transmitted to the first sensor through the user 10 and a second vibration signal of a second frequency range output from the converter 120 may be transmitted to the second sensor through the user 10. For example, when the converter 120 is plural in number and when the sensor 110 is plural in number, the first vibration signal of the first frequency range output from a first converter may be transmitted to the first sensor through the user 10 and the second vibration signal of the second frequency range output from a second converter may be transmitted to the second sensor through the user 10. As such, the biometric authentication apparatus 100 may perform a multi-channel biometric authentication operation according to a frequency range.

The authentication module 130 may control an operation of at least any one of the sensor 110, the converter 120, and the memory 140. For example, the authentication module 130 may control an operation of the converter 120 based on the user contact signal or the user approaching signal. The authentication module 130 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for performing other functions.

The authentication module 130 may receive a biometric signal from the sensor 110 and may extract anatomical feature information of the user 10 from the biometric signal. The authentication module 130 may determine whether the user 10 is a registered user based on anatomical feature information of the user 10. A detailed description of the authentication module 130 will be given below with reference to FIG. 2.

The anatomical feature information may include at least one of a biomaterials feature, a biomechanical feature, and a geometrical structure feature for at least one of a bone, a cartilage, a tendon, and a muscle tissue, which are included in at least a portion of the body. Because the biometric signal such as a brainwave or electrocardiogram (ECG) has a lot of variation depending on mental and physical states such as emotion or exercise and health of a user, a biometric authentication technology using the biometric signal may be low in accuracy. However, because the biometric signal according to the present disclosure includes structural anatomical feature information of a bone, a muscle tissue, or the like, an accurate and reliable biometric authentication technology may be implemented.

The memory 140 may be electrically connected with the authentication module 130. The memory 140 may store data processed by the authentication module 130. For example the memory 140 may store a database generated by the authentication module 130. The database may include information about a registered user. For example, the information about the registered user may include anatomical feature information of the registered user, ID information of the registered user, and the like. The memory 140 may be configured in hardware as at least any one of a read-only memory (ROM), a random access memory (RAM), an erasable programmable ROM (EPROM), a flash drive, or a hard drive. According to an embodiment, the memory 140 may be implemented integrally with the authentication module 130.

According to an embodiment, the biometric authentication apparatus 100 may further include a vibration insulator (not shown). The vibration insulator may be located between the sensor 110 and the converter 120. The vibration insulator may prevent the vibration signal output from the converter 120 from being directly input to the sensor 110 without passing through the user 10. According to an embodiment, the vibration insulator may be disposed to cover the converter 120.

According to an embodiment, the biometric authentication apparatus 100 may further include a guide (not shown).

The guide may be in contact with at least a portion of the body of the user 10 to fix the at least portion of the body of the user 10. In other words, the body of the user 10 and the contact portion of the biometric authentication apparatus 100 may be kept constant by the guide.

According to an embodiment, the biometric authentication device 100 may include a vibration signal transceiver (not shown). In this case, the vibration signal transceiver may include a sensing circuit and a conversion circuit. The sensing circuit may correspond to the sensor 110 and the conversion circuit may correspond to the converter 120. Accordingly, the sensing circuit may perform the operation of the sensor 110 described above and the conversion circuit may perform the operation of the converter 120 described above. For example, the sensing circuit may output vibration signals based on a frequency spectrum to the user 10, and the conversion circuit may receive biometric signals including anatomical feature information from the user 10. In this case, the sensing circuit and the conversion circuit may not be spaced apart. Hereinafter, in the specification, the biometric authentication device 100 is described as including the sensor 110 and the converter 120, but is not limited thereto, and may be understood as including the vibration signal transceiver.

As described above, the biometric authentication apparatus 100 may apply vibration signals of various frequencies to various in-vivo routes, may receive a plurality of biometric signals including anatomical feature information, and may perform user authentication based on the anatomical feature information. As a result, the biometric authentication apparatus 100 may implement a biometric authentication technology with higher reliability than an image-based biometric authentication technology or a brainwave- or ECG-based biometric authentication technology.

Figure 2:
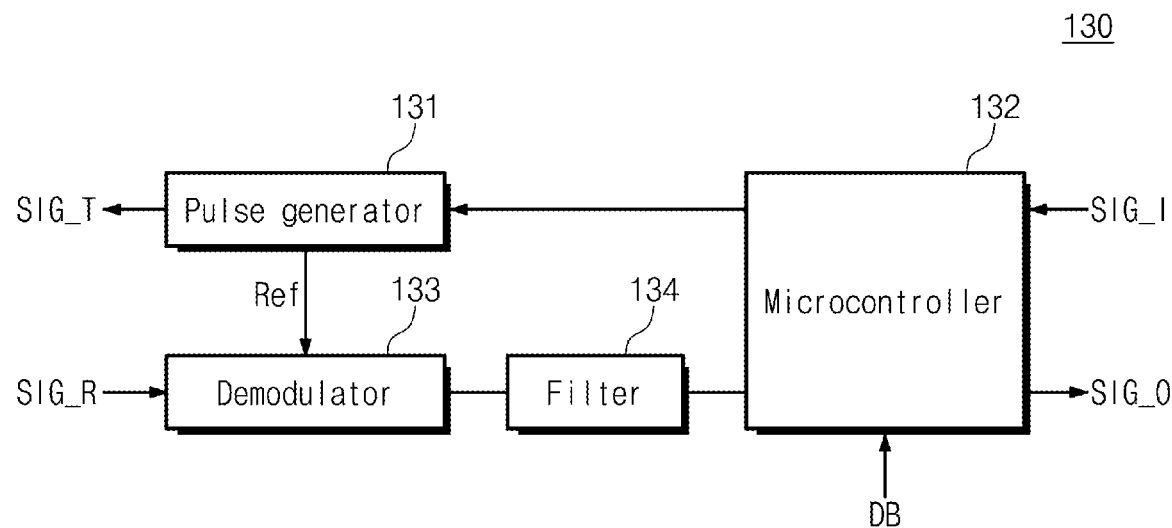
FIG. 2 is a block diagram of the authentication module of FIG. 1.

FIG. 2 is a block diagram of the authentication module of FIG. 1. Referring to FIGS. 1 and 2, an authentication module 130 may include a waveform generator 131, a micro-controller 132, a demodulator 133, and a filter 134.

The waveform generator 131 may receive a frequency setting signal from the micro-controller 132. The waveform generator 131 may modulate a frequency or a waveform in response to the frequency setting signal to generate a reference waveform Ref within a set frequency range and may output a transmit signal SIG_T for delivering the reference waveform Ref to a converter 120. The converter 120 may convert the transmit signal SIG_T which is an electrical signal into a vibration signal which is a vibration signal in response to the transmit signal SIG_T. According to an embodiment, the waveform generator 131 may transmit the reference waveform Ref to the demodulator 133.

The demodulator 133 may receive a receive signal SIG_R from the sensor 110. The receive signal SIG_R may be a signal in which a biometric signal being a mechanical signal is converted into an electrical signal by a sensor 110. The receive signal SIG_R may include anatomical feature information about a user 10 like a biometric signal. The demodulator 133 may demodulate the receive signal SIG_R based on the reference waveform Ref.

According to an embodiment, the demodulator 133 may be plural in number. For example, a biometric authentication apparatus 100 may perform a multi-channel authentication operation, and the demodulator 133 may be plural in number to demodulate a receive signal depending to a reference waveform for each channel.

The filter 134 may receive the demodulated receive signal SIG_R from the demodulator 133 to remove noise. For example, the filter 134 may be a low pass filter. The low pass filter may filter a frequency component higher than a set cutoff frequency and may provide the micro-controller 132 with the signal, high-frequency noise of which is removed. According to an embodiment, when the demodulator 133 is plural in number, the filter 134 may be plural in number to correspond to the number of the demodulators 133.

The micro-controller 132 may process the filtered receive signal SIG_R to extract anatomical feature information. According to an embodiment, the micro-controller 132 may include an analog-to-digital converter. The analog-to-digital converter may convert the filtered receive signal SIG_R into a digital signal. The micro-controller 132 may extract anatomical feature information from the digital signal.

The micro-controller 132 may classify a user based on the anatomical feature information. The micro-controller 132 may classify the user using a classification algorithm (e.g., machine learning). For example, an algorithm such as support vector machine (SVM), random forest (RF), linear discriminant analysis (LDA), or convolutional neural network algorithms proposed by Salamon and Bello (SB-CNN) may be used to classify the user based on an acoustic vibration signal.

The micro-controller 132 may compare the classified user with a registered user to determine whether the classified user corresponds to the registered user. The micro-controller 132 may receive a database DB from a memory 140. Registration user information about the registered user may be stored in the database DB. For example, the registration user information may include anatomical feature information of the registered user, ID information of the registered user, and the like.

The micro-controller 132 may search for registration user information corresponding to information of the classified user. The micro-controller 132 may search for registration user information corresponding to anatomical feature information of the classified user and may output an output signal SIG_O including result data. For example, the output signal SIG_O may be a signal for outputting a success message or a failure message for user authentication. When the registration user information corresponding to information of the classified user is found, the micro-controller 132 may output the success message for the user authentication. When the registration user information corresponding to information of the classified user is not found, the micro-controller 132 may output the failure message for the user authentication.

According to an embodiment, the micro-controller 132 may determine a similarity between the information of the classified user and the registration user information. When the similarity is greater than a reference value, the micro-controller 132 may output the success message for the user authentication. When the similarity is less than or equal to the reference value, the micro-controller 132 may output the failure message for the user authentication.

According to an embodiment, the micro-controller 132 may update the database DB. For example, when the user authentication succeeds, the micro-controller 132 may update the anatomical feature information of the registered user. The anatomical feature information may be varied over time according to a biometric change. Thus, when the user authentication succeeds, the micro-controller 132 may update the registration user information to latest anatomical feature information. According to an embodiment, the micro-controller 132 may update the registration user information at a predetermined period.

According to an embodiment, the micro-controller 132 may receive an input signal SIG_I and may provide the waveform generator 131 with a frequency setting signal. For example, the input signal SIG_I may include a user contact signal generated from a touch sensor or a user approaching signal generated from a proximity sensor. The micro-controller 132 may control the waveform generator 131 to generate the reference waveform Ref in response to the user contact signal or the user approaching signal.

Figure 3A:
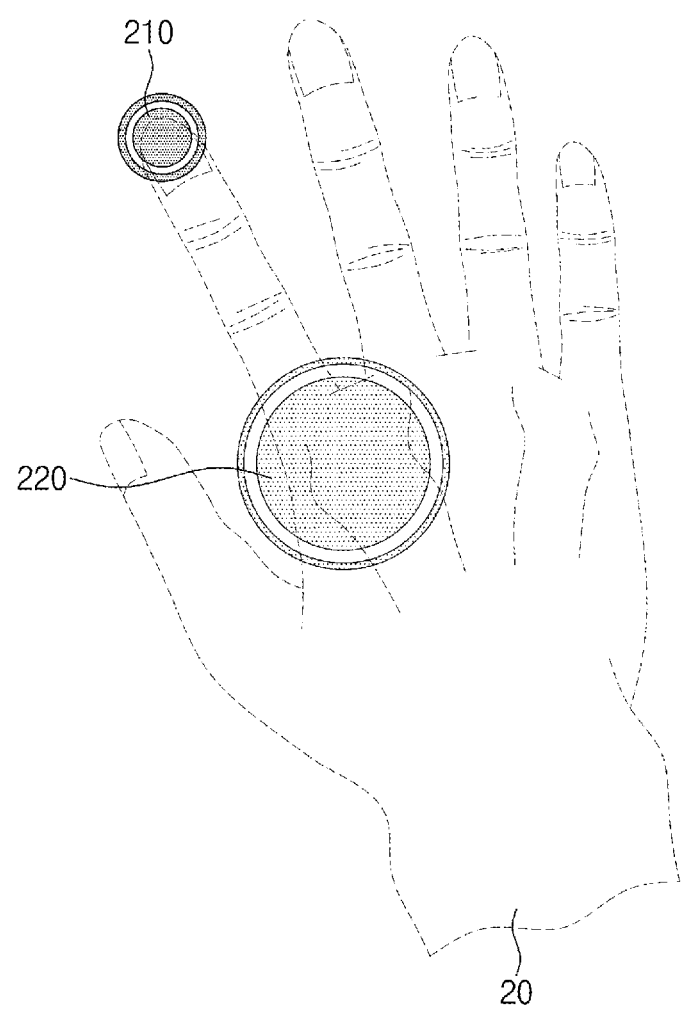
FIGS. 3A and 3B are drawings illustrating a detailed embodiment of the biometric authentication apparatus of FIG. 1.
Figure 3B:
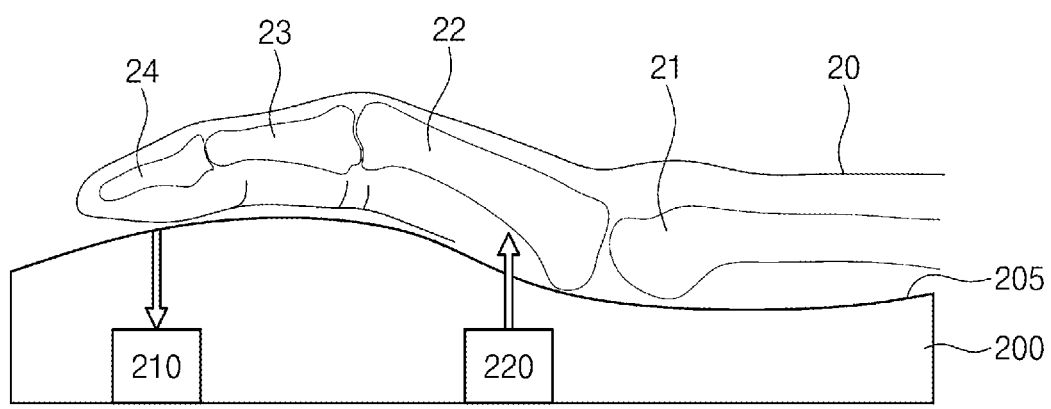

FIGS. 3A and 3B are drawings illustrating a detailed embodiment of the biometric authentication apparatus of FIG. 1. FIG. 3A illustrates a biometric authentication apparatus 200 which performs user authentication by means of a finger in a portion of the body of a user. FIG. 3B is a drawing illustrating an anatomical feature of a finger.

Referring to FIGS. 1, 3A, and 3B, the biometric authentication apparatus 200 may include a sensor 210 and a converter 220. Because the sensor 210 and the converter 220 are similar to a sensor 110 and a converter 120 of FIG. 1, a detailed description thereof will be omitted.

The sensor 210 may be disposed spaced apart from the converter 220. A separation distance between the sensor 210 and the converter 220 may vary with a body portion of a user 10 to be detected. The user 10 may place a hand 20 to cover the sensor 210 and the converter 220. For example, a tip of the index finger may be located on a point corresponding to the sensor 210, and a start portion of the index finger may be located on a point corresponding to the converter 220.

According to an embodiment, the biometric authentication device 200 may include a vibration signal transceiver including a sensing circuit and a conversion circuit. In this case, the sensing circuit and the conversion circuit may not be spaced apart. For example, the sensing circuit and the conversion circuit may be located together at the start portion of the index finger. The vibration signal output from the conversion circuit can pass through the tip of the index finger and return back to the start portion of the index finger, and the sensing circuit can detect this.

It is specified that the index finger is in contact with the biometric authentication apparatus 200 in FIGS. 3A and 3B for convenience of description, but a portion where the hand 20 of the user 10 is in contact with the biometric authentication apparatus 200 is not limited thereto. For example, the middle finger may be located to cover the sensor 210 and the converter 220, or another body portion rather than the hand 20 may be located to cover the sensor 210 and the converter 220.

The hand 20 may include a metacarpus 21, a proximal phalanx 22, a middle phalanx 23, and a distal phalanx 24. The sensor 210 may be disposed on a lower portion of the distal phalanx 24. The converter 220 may be disposed on a lower portion of the metacarpus 21 or the proximal phalanx 22. A vibration signal output from the converter 220 may be input to the metacarpus 21 or the proximal phalanx 22 and may be delivered as a biometric signal to the sensor 210 through the middle phalanx 23, and the distal phalanx 24. Although not illustrated, a flexible polymer may be disposed to cover the sensor 210 to amplify signal sensitivity, and the biometric signal may be delivered to the sensor 210 through the polymer.

A guide 205 for uniformly bringing the index finger into contact with the biometric authentication apparatus 200 may be formed on a surface of the biometric authentication apparatus 200. The user 10 may bring the hand 20 into contact with the biometric authentication apparatus 200 along the guide 205. The sensor 210 and the converter 220 may be disposed in a direction opposite to a surface which is in contact with the hand 20 on the guide 205. A point corresponding to the location of the sensor 210 and a point corresponding to the location of the converter 220 may be displayed on the guide 205, and the user 10 may bring the tip of the index finger into contact with the point corresponding to the location of the sensor 210 to start a user authentication operation.

The converter 220 may output a vibration signal to the metacarpus 21 or the proximal phalanx 22 depending on a finger length of the user 10. In this case, the user 10 may bring the tip of the index finger into contact with the point corresponding to the location of the sensor 210. For a user who has an index finger less than a reference length, the converter 220 may be located on a lower portion of the metacarpus 21. For a user who has an index finger greater than or equal to the reference length, the converter 220 may be located on a lower portion of the proximal phalanx 22.

Thus, although finger lengths of the user 10 differ from each other, a vibration signal output from the converter 220 may be input as a biometric signal to the sensor 210 through the proximal phalanx 22, the middle phalanx 23, and the distal phalanx 24. Thus, the biometric signal may be modified according to a bone structure, a muscle tissue, or the like of the index finger and may include anatomical feature information about the index finger.

In other words, the biometric authentication apparatus 200 may uniformly place the sensor 210 on a lower portion of the distal phalanx 24 of the index finger by means of the guide 205. Thus, the biometric authentication apparatus 200 may obtain stable result data in repeatedly extracting anatomical feature information.

Figure 4:
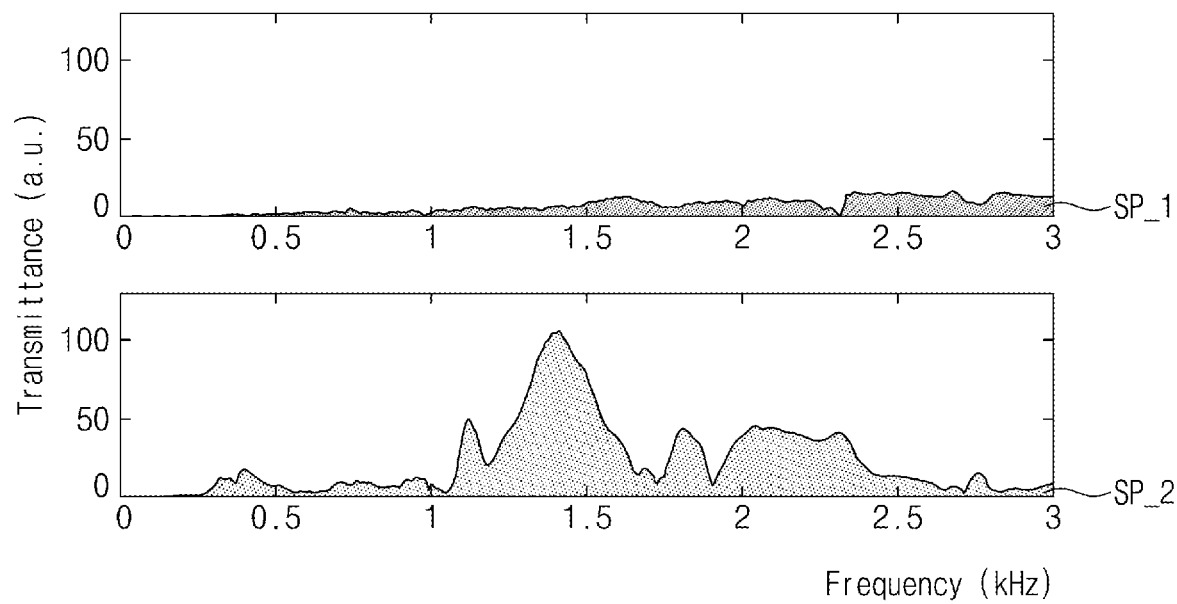
FIGS. 4 and 5 are graphs illustrating a frequency response curve obtained from the biometric authentication apparatus of FIG. 3B.
Figure 5:
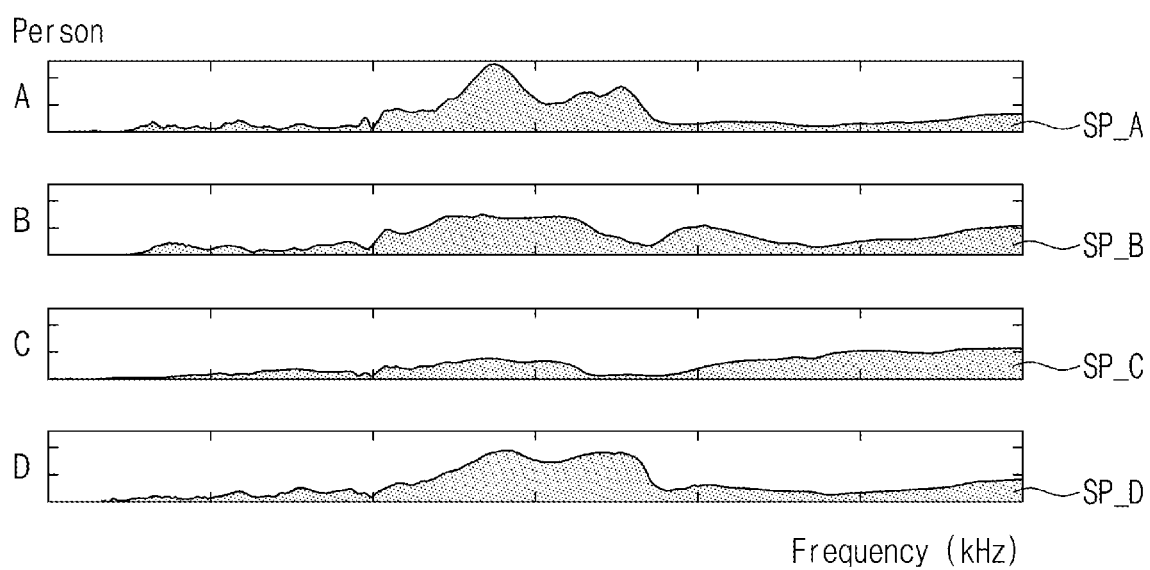

FIGS. 4 and 5 are graphs illustrating a frequency response curve obtained from the biometric authentication apparatus of FIG. 3B. FIG. 4 illustrates a frequency response curve according to a contact between a biometric authentication apparatus 200 and a hand 20. FIG. 5 illustrates a frequency response curve for each user. The x-axis of FIGS. 4 and 5 refers to frequency kHz, and the y-axis is transmittance and refers to, for example, intensity of the biometric signal or the receive signal. In the specification below, the transmittance is described as, but not limited to, intensity mV of the receive signal.

Referring to FIGS. 3B and 4, when the hand 20 is not in contact with the biometric authentication apparatus 200, a first frequency response curve SP_1 may not have a large difference in a set frequency range (0 kHz to 3 kHz). On the other hands, when the hand 20 is in contact with the biometric authentication apparatus 200, a second frequency response curve SP_2 may have a large change in the set frequency range (0 kHz to 3 kHz). For example, intensity of a receive signal may have a maximum value of 106 mV at 1.4 kHz.

As such, the frequency response curve when the hand 20 is in contact with the biometric authentication apparatus 200 and the frequency response curve when the hand 20 is not in contact with the biometric authentication apparatus 200 may be distinguished from each other. In other words, the biometric authentication apparatus 200 may perform user authentication using a frequency response characteristic according to an acoustic vibration signal. Herein, whether a frequency response characteristic according to an acoustic vibration signal for each user may be distinguished may be a problem.

Referring to FIGS. 3B and 5, when a different person A, B, C, or D brings the hand 20 into contact with the biometric authentication apparatus 200, frequency response curves SP_A, SP_B, SP_C, and SP_D respectively according to the persons A, B, C, and D may have different forms. For example, sizes of the frequency response curves SP_A, SP_B, SP_C, and SP_D may differ from each other within the set frequency range (0 kHz to 3 kHz). Alternatively, peak values and peak frequencies of the frequency response curves SP_A, SP_B, SP_C, and SP_D may differ from each other. The biometric authentication apparatus 200 may compare the frequency response curves SP_A, SP_B, SP_C, and SP_D to distinguish the persons A, B, C, and D.

The biometric authentication apparatus 200 may previously store a frequency response curve for a registered user and may obtain a frequency response curve for a user who requires user authentication to determine whether the obtained frequency response curve corresponds to the previously stored frequency response curve. Because the frequency response curve SP_A, SP_B, SP_C, or SP_D includes anatomical feature information of each of the persons A, B, C, and D, the frequency response curve SP_A, SP_B, SP_C, and SP_D may be distinguished from each other. The anatomical feature information may differ for each of the persons A, B, C, and D and may differ per body portion. In other words, the biometric authentication apparatus 200 may perform an accurate and reliable user authentication operation by means of the anatomical feature information.

Figure 6:
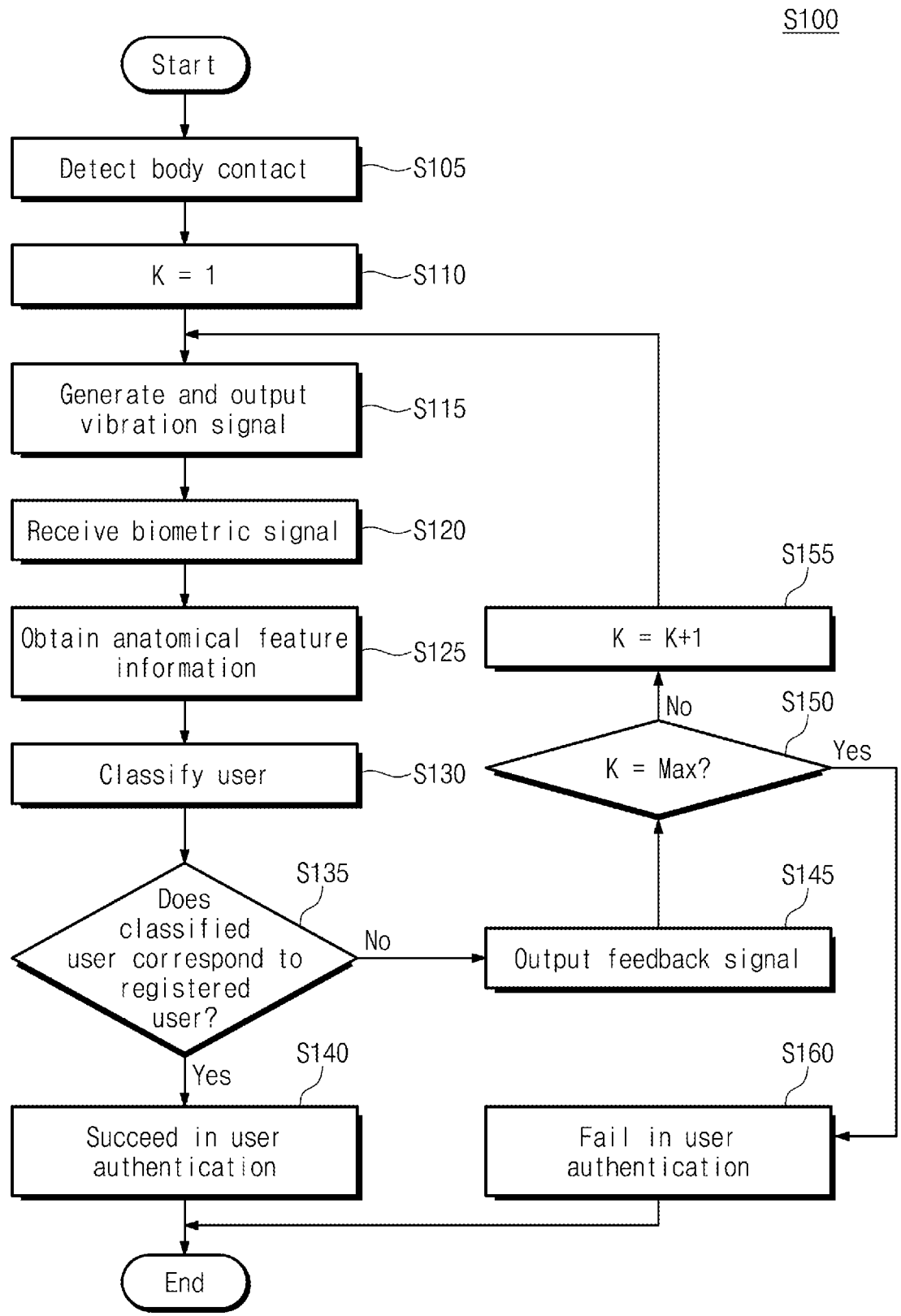
FIG. 6 is a flowchart illustrating an operation method of a biometric authentication apparatus according to an embodiment of the present disclosure.

FIG. 6 is a flowchart illustrating an operation method of a biometric authentication apparatus according to an embodiment of the present disclosure. Referring to FIGS. 1 and 6, in operation S105, a biometric authentication apparatus 100 may detect a body contact and may perform a user authentication operation.

The user authentication operation may be repeated a predetermined number of times. For example, the user authentication operation may be repeated five times for one user. In operation S110, the biometric authentication apparatus 100 may perform a first (K=1) user authentication operation in response to detecting the body contact.

In operation S115, the biometric authentication apparatus 100 may generate a vibration signal and may output the generated vibration signal to a user 10. The vibration signal may be an acoustic vibration signal within a set frequency range. The biometric authentication apparatus 100 may perform multi-channel authentication and may generate and output a vibration signal of a different frequency range for each channel. The vibration signal may pass through a portion of a body of the user 10 to be input to the biometric authentication apparatus 100.

In operation S120, the biometric authentication apparatus 100 may receive a biometric signal. The biometric signal may include anatomical feature information as a signal modified while passing through a portion of the body of the user 10. Because the vibration signal is a signal corresponding to the vibration signal, it may be an acoustic vibration signal. The biometric authentication apparatus 100 may convert the biometric signal into a receive signal which is an electrical signal by means of a sensor 110.

In operation S125, the biometric authentication apparatus 100 may extract anatomical feature information from the receive signal. The anatomical feature information may include at least one of a biomaterials feature, a biomechanical feature, and a geometrical structure feature for at least one of a bone, a cartilage, a tendon, and a muscle tissue, which are included in at least a portion of the body of the user 10. The biometric authentication apparatus 100 may demodulate the receive signal based on a reference waveform, may remove noise from the demodulated signal, and may convert the signal from which the noise is removed into a digital signal. The biometric authentication apparatus 100 may process the digital signal to extract anatomical feature information.

In operation S130, the biometric authentication apparatus 100 may classify a user based on the anatomical feature information. According to an embodiment, the biometric authentication apparatus 100 may classify a user using a classification algorithm. For example, the classification algorithm may be one of support vector machine (SVM), random forest (RF), linear discriminant analysis (LDA), or convolutional neural network algorithms proposed by Salamon and Bello (SB-CNN).

In operation S135, the biometric authentication apparatus 100 may determine whether there is a registered user corresponding to the classified user in a database. For example, the biometric authentication apparatus 100 may search the database for registration user information corresponding to anatomical feature information of the classified user. According to an embodiment, the biometric authentication apparatus 100 may determine a similarity between the anatomical feature information of the classified user and the anatomical feature information of the registered user to determine whether there is the registered user corresponding to the classified user.

When it is determined that there is the registered user corresponding to the classified user, in operation S140, the biometric authentication apparatus 100 may output an output signal for success in user authentication. For example, the biometric authentication apparatus 100 may output a success message for user authentication to the user 10.

When it is determined that there is no the registered user corresponding to the classified user, in operation S145, the biometric authentication apparatus 100 may output a feedback signal. For example, the feedback signal may be a signal for outputting a message requesting the user 10 to perform re-authentication. The user authentication operation may be repeated a predetermined number of times. In operation S150, the biometric authentication apparatus 100 may determine whether the current user authentication stage is a final stage of the predetermined number of times. When the current user authentication stage is not the final stage, in operation S155, the biometric authentication apparatus 100 may perform a next user authentication stage.

When the current user authentication stage is the final stage of the predetermined number of times, in operation S160, the biometric authentication apparatus 100 may output an output signal for failure in user authentication. For example, the biometric authentication apparatus 100 may output a failure message for user authentication to the user 10.

Figure 7:
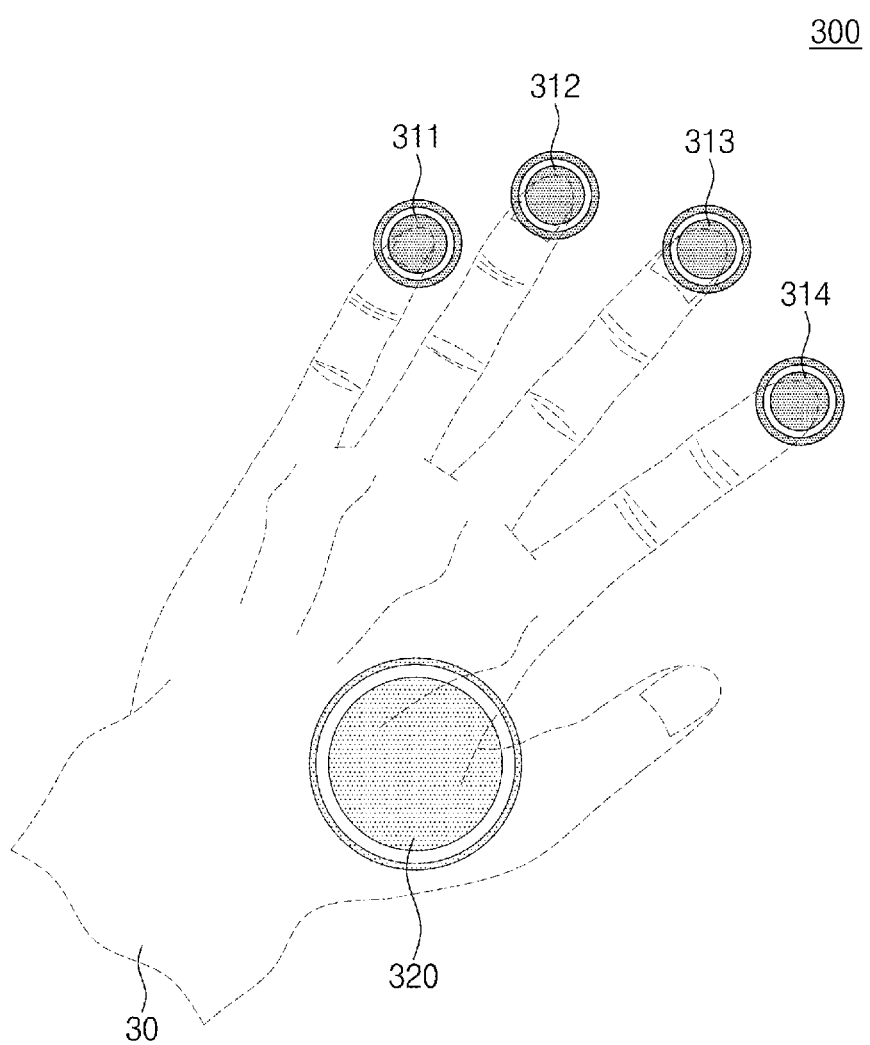
FIG. 7 is a drawing illustrating a detailed embodiment of the biometric authentication apparatus of FIG. 1.

FIG. 7 is a drawing illustrating a detailed embodiment of the biometric authentication apparatus of FIG. 1. Referring to FIGS. 1 and 7, a biometric authentication apparatus 300 may include first to fourth sensors 311 to 314 and a converter 320. Because each of the first to fourth sensors 311 to 314 and the converter 320 are similar to a sensor 110 and a converter 120 of FIG. 1, a detailed description thereof will be omitted.

The first to fourth sensors 311 to 314 may be disposed spaced apart from each other. Each of the first to fourth sensors 311 to 314 may be disposed spaced apart from the converter 320. A user 10 may place a hand 30 to cover the first to fourth sensors 311 to 314 and the converter 320. For example, a tip of the little finger may be located on a point corresponding to the first sensor 311, a tip of the ring finger may be located on a point corresponding to the second sensor 312, a tip of the middle finger may be located on a point corresponding to the third sensor 313, and a tip of the index finger may be located on a point corresponding to the fourth sensor 314. A palm may be located on a point corresponding to the converter 320. The number of sensors and the contact portion with the user 10 are specified for convenience of description, but the present disclosure is not limited thereto.

The converter 320 may output first to fourth vibration signals of first to fourth set frequency ranges. The first to fourth set frequency ranges may be the same as or differ from each other. The first vibration signal may change to a first biometric signal, while output from the converter 320 and passing through the hand 30. The first sensor 311 may receive the first biometric signal corresponding to the first vibration signal. Similar to the first vibration signal, the second to fourth vibration signals may respectively change to second to fourth biometric signals, while output from the converter 320 and passing through the hand 30.

The second sensor 312 may receive the second biometric signal corresponding to the second vibration signal. The third sensor 313 may receive the third biometric signal corresponding to the third vibration signal. The fourth sensor 314 may receive the fourth biometric signal corresponding to the fourth vibration signal. In other words, the first to fourth vibration signals may pass through different portions of the hand 30 to change to the first to fourth biometric signals and may be sensed by the first to fourth sensors 311 to 314.

The first to fourth biometric signals may include different anatomical feature information. The first biometric signal may include anatomical feature information for the little finger of the hand 30. The second biometric signal may include anatomical feature information for the ring finger of the hand 30. The third biometric signal may include anatomical feature information for the middle finger of the hand 30. The fourth biometric signal may include anatomical feature information for the index finger of the hand 30.

According to an embodiment, the converter 320 may be plural in number. For example, the converter 320 may include first to fourth converters. The first to fourth converters may respectively output the first to fourth vibration signals to be input to the first to fourth sensors 311 to 314. In this case, the first to fourth converts may be respectively arranged spaced apart from the first to fourth sensors 311 to 314 at a certain distance.

Figure 8:
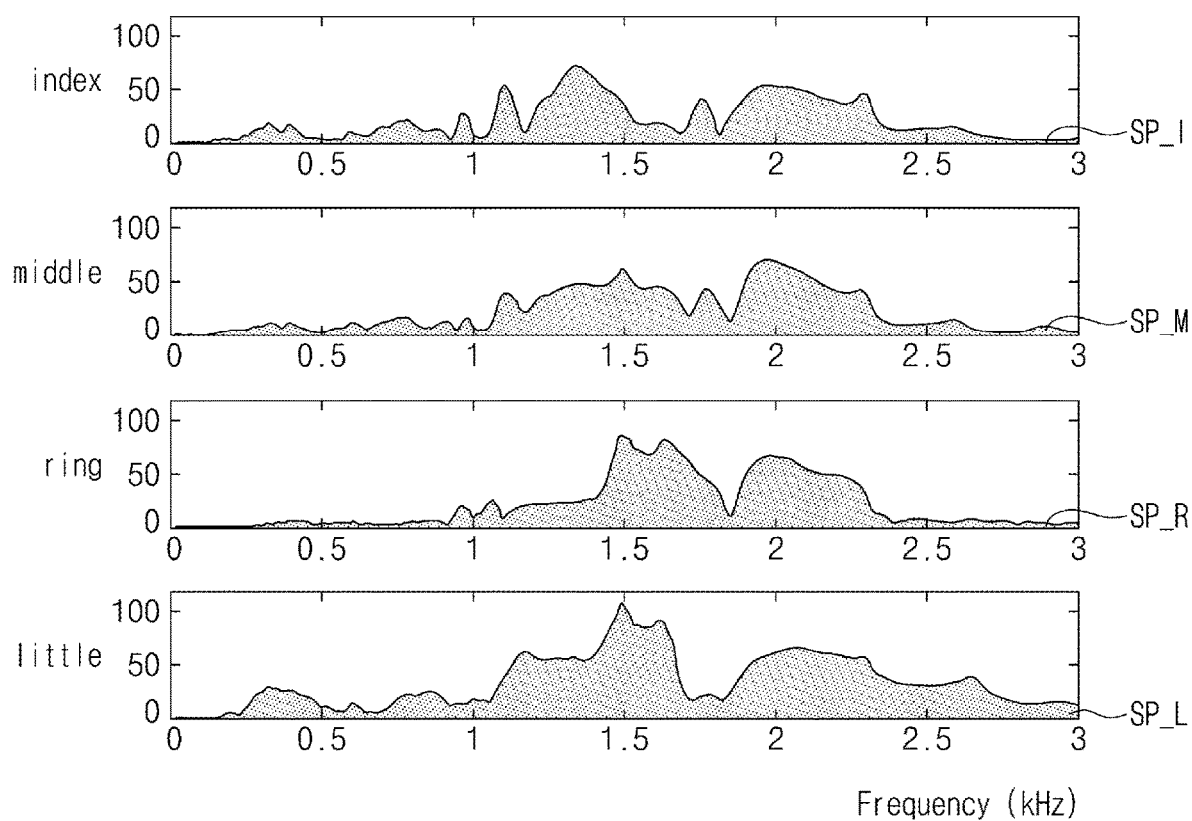
FIG. 8 is a graph illustrating a frequency response curve obtained from the biometric authentication apparatus of FIG. 7.

FIG. 8 is a graph illustrating a frequency response curve obtained from the biometric authentication apparatus of FIG. 7. The x-axis of FIG. 8 is frequency kHz, and the y-axis is transmittance and refers to, for example, intensity of the receive signal.

Referring to FIGS. 7 and 8, first to fourth biometric signals may be converted into first to fourth receive signals and may indicate first to fourth different frequency response curves SP_L, SP_R, SP_M, and SP_I within a set frequency range (0 kHz to 3 kHz). Because the first to fourth biometric signals include different anatomical information, the first to fourth frequency response curves SP_L, SP_R, SP_M, and SP_I may be distinguished from each other. A biometric authentication apparatus 300 may determine whether the first to fourth biometric signals pass through any portion of the body based on the first to fourth frequency response curves SP_L, SP_R, SP_M, and SP_I.

In other words, the biometric authentication apparatus 300 may receive the first to fourth biometric signals changed while passing through different portions of the body although outputting vibration signals within the same set frequency range (0 kHz to 3 kHz), thus performing multi-channel user authentication. For example, the biometric authentication apparatus 300 may perform user authentication while changing the number of channels depending to a security level. In detail, the biometric authentication apparatus 300 may increase a channel of user authentication to access content of a high security level.

According to an embodiment, the biometric authentication apparatus 300 may perform user authentication for each channel by means of a switching operation. The switching operation may be performed by changing a channel over time or setting a different frequency range for each channel.

Figure 9:
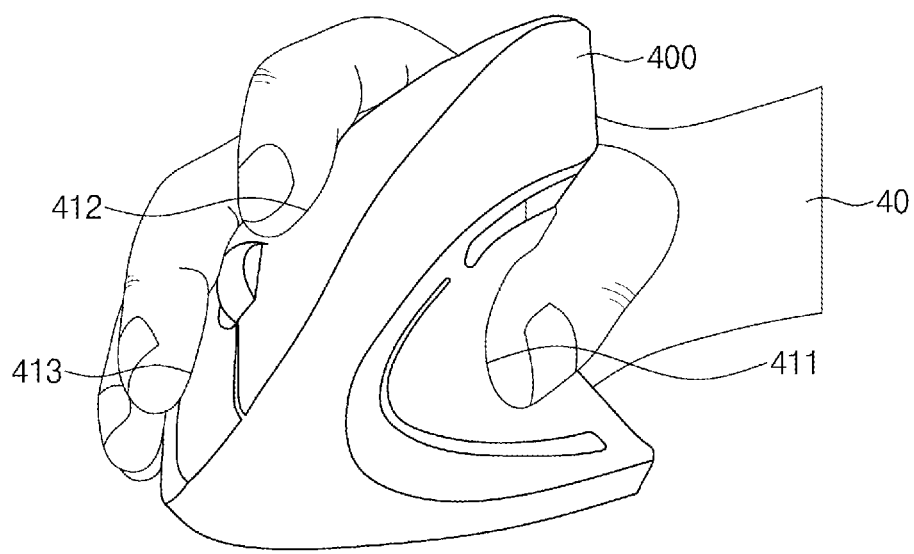
FIG. 9 is a drawing illustrating a detailed embodiment of the biometric authentication apparatus of FIG. 1.

FIG. 9 is a drawing illustrating a detailed embodiment of the biometric authentication apparatus of FIG. 1. Referring to FIGS. 1 and 9, a biometric authentication apparatus 100 may be mounted on a mouse 400. The mouse 400 may specify a place where a hand 40 is located. For example, the mouse 400 may include a guide 411 where the thumb is located, a left-click button 412 where the index finger is located, and a right-click button 413 where the middle finger is located.

A sensor 110 may include first to third sensors. To facilitate the sensing of a biometric signal, the first to third sensors may be arranged on a lower portion of the guide 411, the left-click button 412, and the right-click button 413. Although not illustrated, a converter 120 may be disposed on a portion where the mouse 400 is in contact with the palm of the hand 40.

According to an embodiment, the biometric authentication apparatus 100 may be embedded in devices with which the hand of a user 10 is in contact, for example, various knobs, keyboards, and smartphones. Furthermore, the biometric authentication apparatus 100 may be embedded in devices with which a body portion different from the hand of the user 10 is in contact. For example, the biometric authentication apparatus 100 may be embedded in the bottom which is in contact with the foot, a smart watch which is in contact with the wrist, or the like to perform a user authentication operation.

As described above, the biometric authentication apparatus 100 may be implemented with various types of hardware. Thus, the sensor 110 and the converter 120 may change in number and arrangement. Herein, the biometric authentication apparatus 100 may not use a biometric signal, such as a brainwave or ECG, which is changed according to emotion of the person, without using an image-based biometric signal. The biometric authentication apparatus 100 may output a frequency-based acoustic vibration signal and may obtain biometric information including anatomical feature information based on the acoustic vibration signal. It may not easier to copy the biometric signal including the anatomical feature information than an image-based biometric signal. The biometric signal including the anatomical feature information may indicate a more certain result value than a biometric signal such as a brainwave. In other words, the biometric authentication apparatus 100 may perform user authentication based on the biometric signal including the anatomical feature information, thus implementing a biometric authentication technology, the security and the constancy of which are strengthened.

According to the present disclosure, the biometric authentication apparatus may obtain an anatomical feature of the user by means of the vibration signal, thus stably extracting a unique feature for each person. Thus, the biometric authentication apparatus may solve the problem due to the theft and copying of the image-based biometric authentication technology.

The above-mentioned contents are detailed embodiments for executing the present disclosure. The present disclosure may include embodiments capable of being simply changed in design or being easily changed, as well as the above-mentioned embodiments. Furthermore, the present disclosure may also include technologies capable of being easily modified and executed using embodiments. Therefore, the spirit and scope of the present disclosure is defined not by the above-described embodiments, but by those that are identical or equivalent to the claims of the present disclosure as well as the appended claims, which will be described below.

What is claimed is:

1. A biometric authentication apparatus, comprising:
one or more converters configured to convert a transmit signal of an electrical signal into a vibration signal of a mechanical signal and transmit the vibration signal vibrating within a set frequency range to a user;
one or more sensors configured to receive a biometric signal corresponding to the vibration signal from the user and convert the biometric signal into a receive signal of an electrical signal;
a processing device configured to extract anatomical feature information of the user from the receive signal and determine whether the user is a registered user based on the anatomical feature information; and
a memory configured to store a database for the registered user,
wherein the biometric signal is a frequency-based signal modified to include the anatomical feature information while the vibration signal passes through at least a portion of a body of the user, and
wherein the processing device includes:
a waveform generator configured to generate a reference waveform within the set frequency range and control the one or more converters to output the vibration signal depending on the reference waveform;
a demodulator configured to receive the receive signal from the one or more sensors and demodulate the receive signal based on the reference waveform;
a filter configured to filter the demodulated receive signal; and
a micro-controller configured to process the filtered receive signal to extract the anatomical feature information, classify the user based on the anatomical feature information, and compare the classified user with the registered user to determine whether the classified user corresponds to the registered user.

2. The biometric authentication apparatus of claim 1, wherein the anatomical feature information includes at least one of a biomaterials feature, a biomechanical feature, and a geometrical structure feature for at least one of a bone, a cartilage, a tendon, and a muscle tissue, which are included in the at least a portion of the body of the user.

3. The biometric authentication apparatus of claim 1, wherein the micro-controller is configured to receive a user contact signal and controls the waveform generator to generate the reference waveform in response to the user contact signal.

4. The biometric authentication apparatus of claim 1, wherein registration user information including the anatomical feature information of the registered user is stored in the database, and
wherein the micro-controller is configured to receive the registration user information from the memory and retrieve for the registration user information corresponding to information of the classified user.

5. The biometric authentication apparatus of claim 1, wherein the one or more sensors include a first sensor and a second sensor being located at different locations,
wherein each of the first sensor and the second sensor is spaced apart from the one or more converters at a certain distance, and
wherein the first sensor and the second sensor respectively receive a first biometric signal and a second biometric signal passing through different portions of the body of the user.

6. The biometric authentication apparatus of claim 5, wherein the one or more converters include a first converter,
wherein the first convertor is configured to output a first vibration signal of a first set frequency range and a second vibration signal of a second set frequency range,
wherein the first sensor is configured to receive the first biometric signal corresponding to the first vibration signal, and
wherein the second sensor is configured to receive the second biometric signal corresponding to the second vibration signal.

7. The biometric authentication apparatus of claim 5, wherein the one or more converters include a second converter and a third converter being located at different locations,
wherein the second converter is configured to output a third vibration signal of a third set frequency range, and
wherein the third converter is configured to output a fourth vibration signal of a fourth set frequency range.

8. The biometric authentication apparatus of claim 1, wherein the one or more sensors include a third sensor,
wherein the one or more converters include a fourth converter and a fifth converter being located at different locations,
wherein the fourth converter is configured to output a fourth vibration signal of a fourth set frequency range,
wherein the fifth converter is configured to output a fifth vibration signal of a fifth set frequency range, and
wherein the third sensor is configured to receive a fourth biometric signal corresponding to the fourth vibration signal and a fifth biometric signal corresponding to the fifth vibration signal.

9. The biometric authentication apparatus of claim 1, further comprising:
a vibration insulator disposed between the one or more converters and the one or more sensors.

10. The biometric authentication apparatus of claim 1, further comprising:
a guide being in contact with the at least a portion of the body of the user to guide the user in placing the at least a portion of the body of the user.

11. The biometric authentication apparatus of claim 10, wherein the one or more converters and the one or more sensors are arranged in a direction opposite to a surface being in contact with the at least a portion of the body on the guide, and
wherein one or more locations of the one or more converters and one or more locations of the one or more sensors are displayed on the guide.

12. An operation method of a biometric authentication apparatus, the operation method comprising:
outputting a vibration signal vibrating within a set frequency range depending on a reference waveform to a user;
receiving a biometric signal corresponding to the vibration signal from the user;

extracting anatomical feature information of the user from the biometric signal;

classifying the user based on the anatomical feature information;

determining whether the user is a registered user; and completing user authentication in response to determining that the user is the registered user, wherein the biometric signal is measured by a sensor and is a frequency-based signal modified to include the anatomical feature information while the vibration signal passes through at least a portion of a body of the user, wherein the receiving of the biometric signal includes converting the biometric signal into a receive signal of an electrical signal, and wherein the extracting of the anatomical feature information of the user includes:

demodulating the receive signal based on the reference waveform;

filtering the demodulated receive signal;

converting the filtered receive signal into a digital signal; and processing the digital signal to extract the anatomical feature information.

13. The operation method of claim 12, wherein the anatomical feature information includes at least one of a biomaterials feature, a biomechanical feature, and a geometrical structure feature for at least one of a bone, a cartilage, a tendon, and a muscle tissue, which are included in the at least a portion of the body.

14. The operation method of claim 12, wherein the classifying of the user includes classifying the user based on the anatomical feature information using a classification algorithm.

15. The operation method of claim 12, further comprising:

in response to determining that the user is not the registered user:

outputting a feedback signal requesting the user to perform re-authentication; and repeating a user authentication operation a predetermined number of times.

16. A biometric authentication apparatus, comprising:

a vibration signal transceiver configured to transmit a vibration signal to a user and receiving a biometric signal corresponding to the vibration signal;

a processing device configured to extract anatomical feature information of the user based on the biometric signal and determine whether the user is a registered user based on the anatomical feature information; and a memory configured to store a database for the registered user, wherein the vibration signal transceiver includes:

a conversion circuit configured to convert a transmit signal of an electrical signal into the vibration signal of a mechanical signal and transmit the vibration signal vibrating within a set frequency range to the user; and a sensing circuit configured to receive the biometric signal corresponding to the vibration signal from the user and convert the biometric signal into a receive signal of an electrical signal, wherein the biometric signal is a frequency-based signal modified to include the anatomical feature information while the vibration signal passes through at least a portion of a body of the user, and wherein the processing device includes:

a waveform generator configured to generate a reference waveform within the set frequency range and control the vibration signal transceiver to output the vibration signal depending on the reference waveform;

a demodulator configured to receive the receive signal from the sensing circuit and demodulate the receive signal based on the reference waveform;

a filter configured to filter the demodulated receive signal; and a micro-controller configured to process the filtered receive signal to extract the anatomical feature information, classify the user based on the anatomical feature information, and compare the classified user with the registered user to determine whether the classified user corresponds to the registered user.

* * * * *